(12) United States Patent
Hwang et al.

(10) Patent No.: US 9,417,487 B2
(45) Date of Patent: Aug. 16, 2016

(54) LIQUID CRYSTAL DISPLAY HAVING IMPROVED TRANSMITTANCE AND LUMINANCE CHARACTERISTICS

(71) Applicant: Samsung Display Co., Ltd., Yongin, Gyeonggi-Do (KR)

(72) Inventors: Hyun Sik Hwang, Hwaseong-si (KR); In-Jae Hwang, Suwon-si (KR); Dong Hwa Shin, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 171 days.

(21) Appl. No.: 14/468,187

(22) Filed: Aug. 25, 2014

(65) Prior Publication Data

US 2015/0192812 A1    Jul. 9, 2015

(30) Foreign Application Priority Data

Jan. 9, 2014  (KR) .................. 10-2014-0003021

(51) Int. Cl.
   *G02F 1/1343*  (2006.01)
(52) U.S. Cl.
   CPC .............. *G02F 1/134309* (2013.01); *G02F 2001/134345* (2013.01)
(58) Field of Classification Search
   CPC .................................................. G02F 1/13463
   See application file for complete search history.

(56) References Cited

U.S. PATENT DOCUMENTS

| | | | |
|---|---|---|---|
| 7,683,991 | B2 | 3/2010 | Lee et al. |
| 8,154,502 | B2 | 4/2012 | Pak et al. |
| 8,208,080 | B2 | 6/2012 | Zhu et al. |
| 8,279,385 | B2 | 10/2012 | Kim et al. |
| 8,294,866 | B2 | 10/2012 | Ki et al. |
| 8,379,176 | B2 | 2/2013 | Kim et al. |
| 8,421,986 | B2 | 4/2013 | Chen et al. |
| 2011/0222004 | A1 | 9/2011 | Kim |
| 2012/0162559 | A1* | 6/2012 | Kim ................. G02F 1/134363 349/42 |
| 2012/0300148 | A1 | 11/2012 | Hong et al. |
| 2013/0335688 | A1 | 12/2013 | Jung et al. |

FOREIGN PATENT DOCUMENTS

KR    10-2009-0019106 A    2/2009

* cited by examiner

*Primary Examiner* — Phu Vu
(74) *Attorney, Agent, or Firm* — Innovation Counsel LLP

(57) ABSTRACT

A liquid crystal display according to an exemplary embodiment includes: a first subpixel electrode configured to have a first voltage applied thereto; a second subpixel electrode configured to have a second voltage applied thereto; a third subpixel electrode configured to have a third voltage applied thereto; an insulating layer between the first subpixel electrode and the second subpixel electrode or between the second subpixel electrode and the third subpixel electrode; and a common electrode configured to have a common voltage applied thereto, wherein the second subpixel electrode and the third subpixel electrode overlap each other with the insulating layer positioned therebetween, the first subpixel electrode and the third subpixel electrode are disposed at opposing sides of the gate line, and the first voltage and the third voltage are different.

20 Claims, 14 Drawing Sheets

LIQUID CRYSTAL DISPLAY HAVING IMPROVED TRANSMITTANCE AND LUMINANCE CHARACTERISTICS

CROSS-REFERENCE TO RELATED APPLICATION

This application claims priority to, and the benefit of, Korean Patent Application No. 10-2014-0003021 filed in the Korean Intellectual Property Office on Jan. 9, 2014, the entire contents of which are incorporated herein by reference.

BACKGROUND (a) Field

Embodiments of the present invention relate generally to a liquid crystal display. More specifically, embodiments of the present invention relate to a liquid crystal display having improved transmittance and luminance characteristics.

(b) Description of the Related Art

A liquid crystal display is one popular form of flat panel display device that typically includes two display panels where field generating electrodes such as a pixel electrode and a common electrode are formed, with a liquid crystal layer interposed therebetween.

The liquid crystal display generates an electric field in the liquid crystal layer by applying voltages to the field generating electrodes, to determine orientations of liquid crystal molecules of the liquid crystal layer and to control polarization of incident light, thereby displaying an image.

The liquid crystal display includes switching elements each connected to pixel electrodes, and a plurality of signal lines such as data lines and gate lines for applying voltages to the pixel electrodes by controlling the switching elements.

Among these LCDs, a vertical alignment mode LCD, which arranges major axes of liquid crystal molecules so as to be perpendicular to the display panel when an electric field is not applied, has been widely used due to its high contrast ratio and wide reference viewing angle.

In order to approximately match side visibility to that of front visibility in the vertical alignment mode LCD, a method of causing a difference in transmittance by dividing one pixel into two sub-pixels and applying different voltages to the two sub-pixels has been suggested.

However, when dividing one pixel into two subpixels and approximating the side visibility to the front visibility by differentiating the transmittance, the luminance is increased at a low gray or high gray such that gray expression is difficult at the sides, thereby deteriorating display quality.

The above information disclosed in this Background section is only for enhancement of understanding of the background of the invention and therefore it may contain information that does not form the prior art that is already known in this country to a person of ordinary skill in the art.

SUMMARY

The present invention provides a liquid crystal display having advantages of expressing an accurate gray in a low gray region and preventing transmittance deterioration while side visibility is close to front visibility.

Further, the present invention provides a liquid crystal display preventing luminance from being non-uniform by interference between pixels due to a parasitic capacitance.

A liquid crystal display according to an exemplary embodiment of the present invention includes: a first substrate; a first subpixel electrode disposed on the first substrate and configured to have a first voltage applied thereto; a second subpixel electrode disposed on the first substrate and configured to have a second voltage applied thereto; a third subpixel electrode disposed on the first substrate and configured to have a third voltage applied thereto; an insulating layer between the first subpixel electrode and the second subpixel electrode or between the second subpixel electrode and the third subpixel electrode; and a common electrode disposed on a second substrate and configured to have a common voltage applied thereto. The second subpixel electrode and the third subpixel electrode overlap each other with the insulating layer positioned therebetween, the first subpixel electrode and the third subpixel electrode are disposed on opposing sides of the gate line, and the first voltage and the third voltage are different.

The first voltage and the second voltage may be the same.

A difference between the first voltage and the common voltage may be larger than a difference between the third voltage and the common voltage.

The second subpixel electrode may be disposed under the insulating layer, and the first subpixel electrode and the third subpixel electrode may be disposed on the insulating layer.

When the first voltage is applied to the first subpixel electrode, a first electric field is formed in a first region in which the first subpixel electrode is disposed; when the second and third voltages are respectively applied to the second and third subpixel electrodes, a second electric field is formed in a second region in which the second and third subpixel electrodes overlap each other; when the third voltage is applied to the third subpixel electrode, a third electric field is formed in a third region in which the third subpixel electrode is disposed but not the second subpixel. The first, second, and third electric fields may respectively have different magnitudes from one another.

The first subpixel electrode and the second subpixel electrode may be connected to a same input electrode through a first contact hole and a second contact hole.

The first voltage may be applied to the first subpixel electrode by the input electrode, and the second voltage may be applied to the second subpixel electrode.

A passivation layer disposed between the first substrate and the second subpixel electrode may be further included, wherein the first contact hole may be formed through the passivation layer and the insulating layer, and the second contact hole may be formed through the passivation layer.

The third subpixel electrode may be connected to an output electrode through a third contact hole.

The third voltage may be applied by the output electrode.

The first subpixel electrode and the third subpixel electrode may each include a plurality of branch electrodes extending in different directions.

The second subpixel electrode may be at least approximately planar.

The first subpixel electrode and the third subpixel electrode may each outline a cross-shaped portion including a transverse portion and a longitudinal portion crossing the transverse portion, and a plurality of branch electrodes may be at least approximately symmetric with respect to the cross-shaped portion.

The second subpixel electrode may have a shape that is at least approximately symmetric with respect to the cross-shaped portion.

A plurality of gate lines disposed on the first substrate and configured to have a gate signal applied thereto, as well as a plurality of data lines crossing a plurality of gate lines and configured to have a data signal applied thereto may be further included. The plurality of data lines may be configured to be driven by column inversion, and two gate lines among the plurality of gate lines may be configured to be simultaneously turned on.

The plurality of gate lines may include an N-th gate line, an (N+1)-th gate line, an (N+2)-th gate line, and an (N+3)-th gate line, and the N-th gate line and the (N+1)-th gate line may be configured to be simultaneously turned on, and the (N+2)-th gate line and the (N+3)-th gate line may be configured to be simultaneously turned on.

The plurality of gate lines may include a N-th gate line, an (N+1)-th gate line, an (N+2)-th gate line, and an (N+3)-th gate line, and the N-th gate line and the (N+2)-th gate line may be configured to be simultaneously turned on, and the (N+1)-th gate line and the (N+3)-th gate line may be configured to be simultaneously turned on.

According to an exemplary embodiment of the present invention, by forming an intermediate-magnitude electric field through the overlapping of two subpixel electrodes applied with the different voltages, one pixel area is divided into the three different regions, thereby more smoothly controlling the change of the transmittance. Also, by providing a structure in which the gate line of the previous stage is separated from the pixel electrode of the next stage, the luminance non-uniformity depending on the interference between the pixels by the parasitic capacitance may be reduced or prevented.

DETAILED DESCRIPTION OF THE EMBODIMENTS

Figure 1:
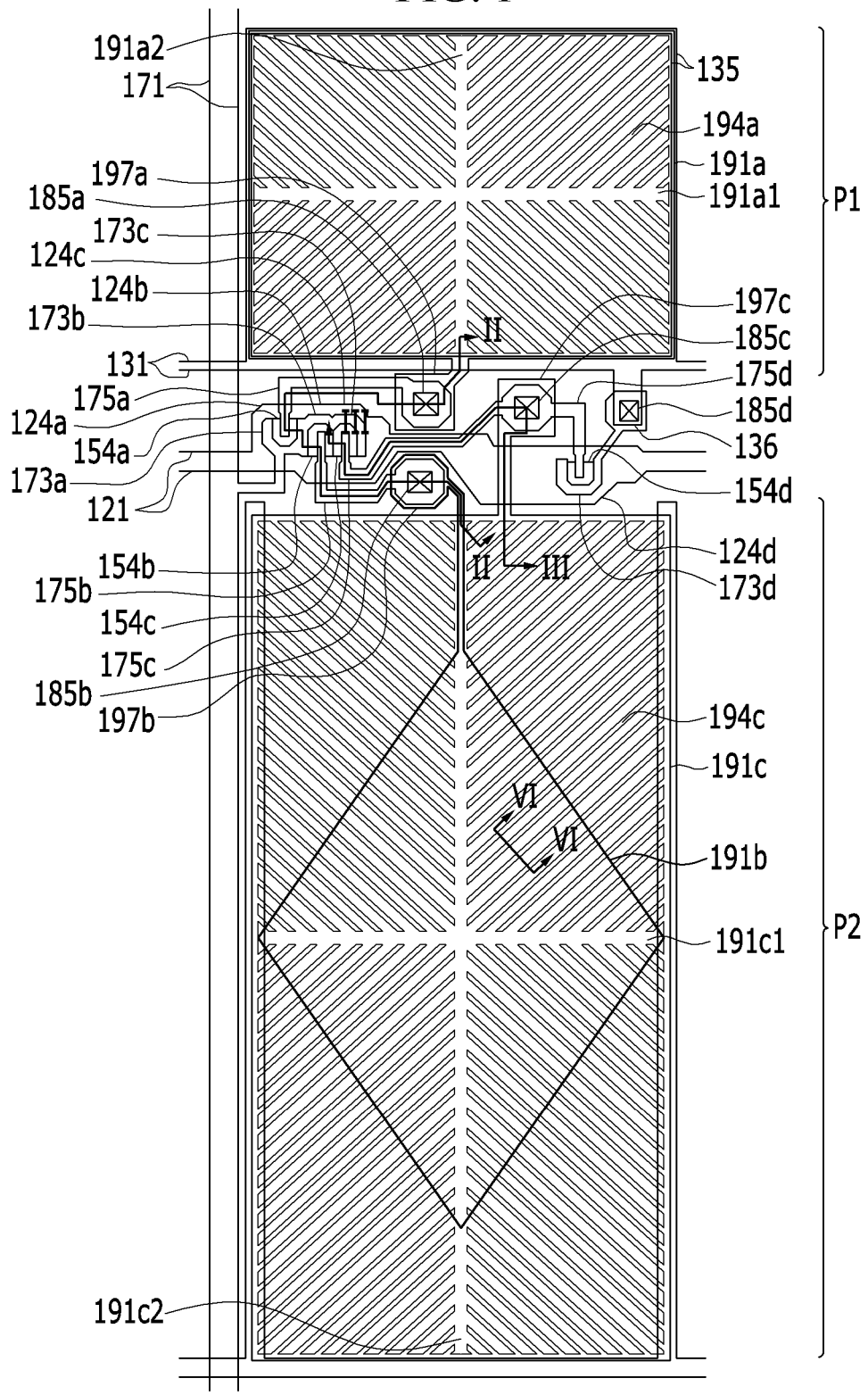
FIG. 1 is a layout view of a liquid crystal display according to an exemplary embodiment of the present invention.

Hereinafter, exemplary embodiments of the present invention will be described in detail with reference to the accompanying drawings. As those skilled in the art would realize, the described embodiments may be modified in various different ways, all without departing from the spirit or scope of the present invention. On the contrary, exemplary embodiments introduced herein are provided to make disclosed contents thorough and complete and sufficiently transfer the spirit of the present invention to those skilled in the art.

In the drawings, the thickness of layers, films, panels, regions, etc., are exaggerated for clarity. The drawings are thus not to scale. It will be understood that when a layer is referred to as being "on" another layer or substrate, it can be directly on the other layer or substrate, or intervening them may also be present. Like reference numerals designate like elements throughout the specification.

Figure 2:
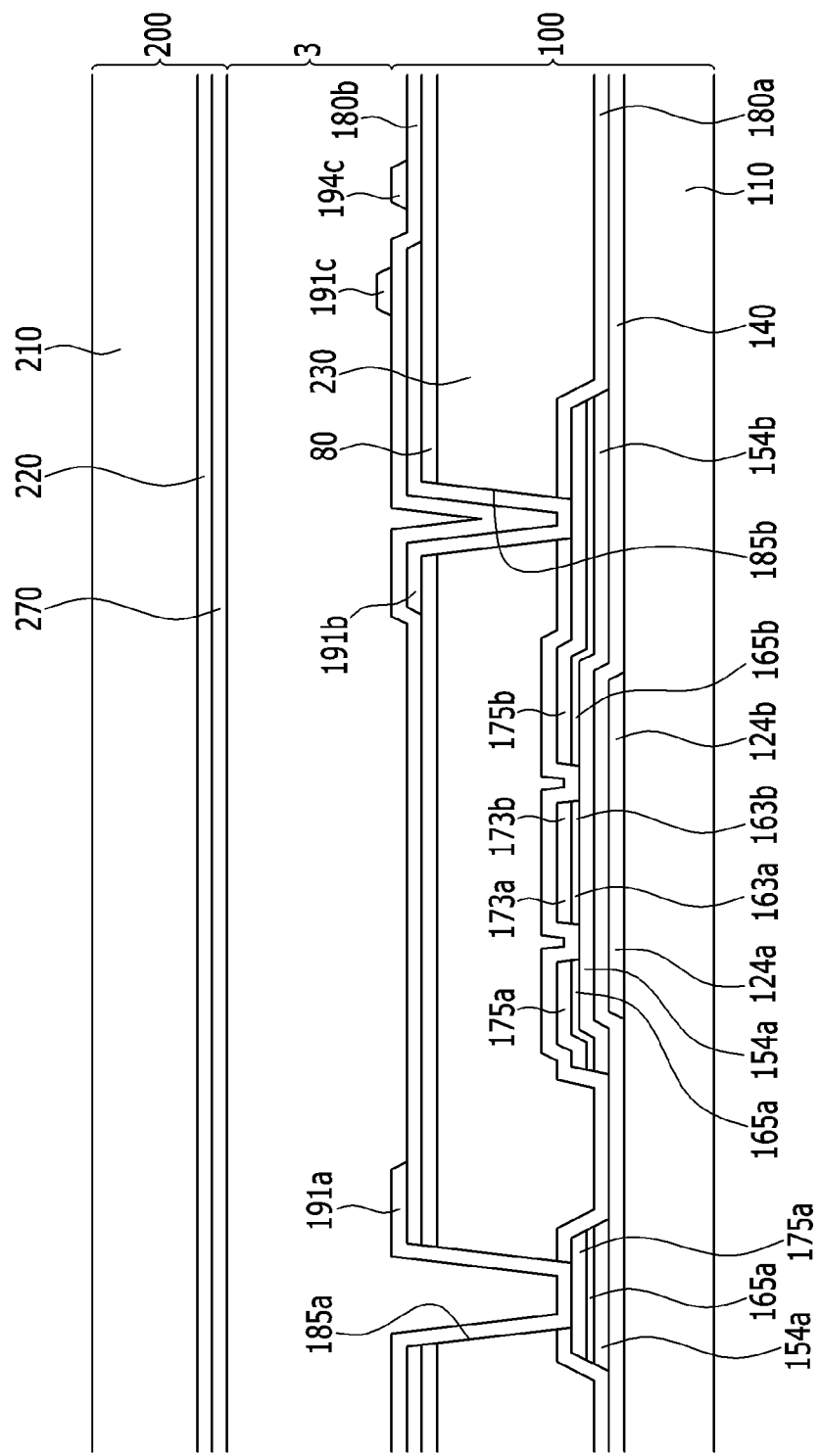
FIG. 2 is a cross-sectional view taken along the line II-II of FIG. 1.
Figure 3:
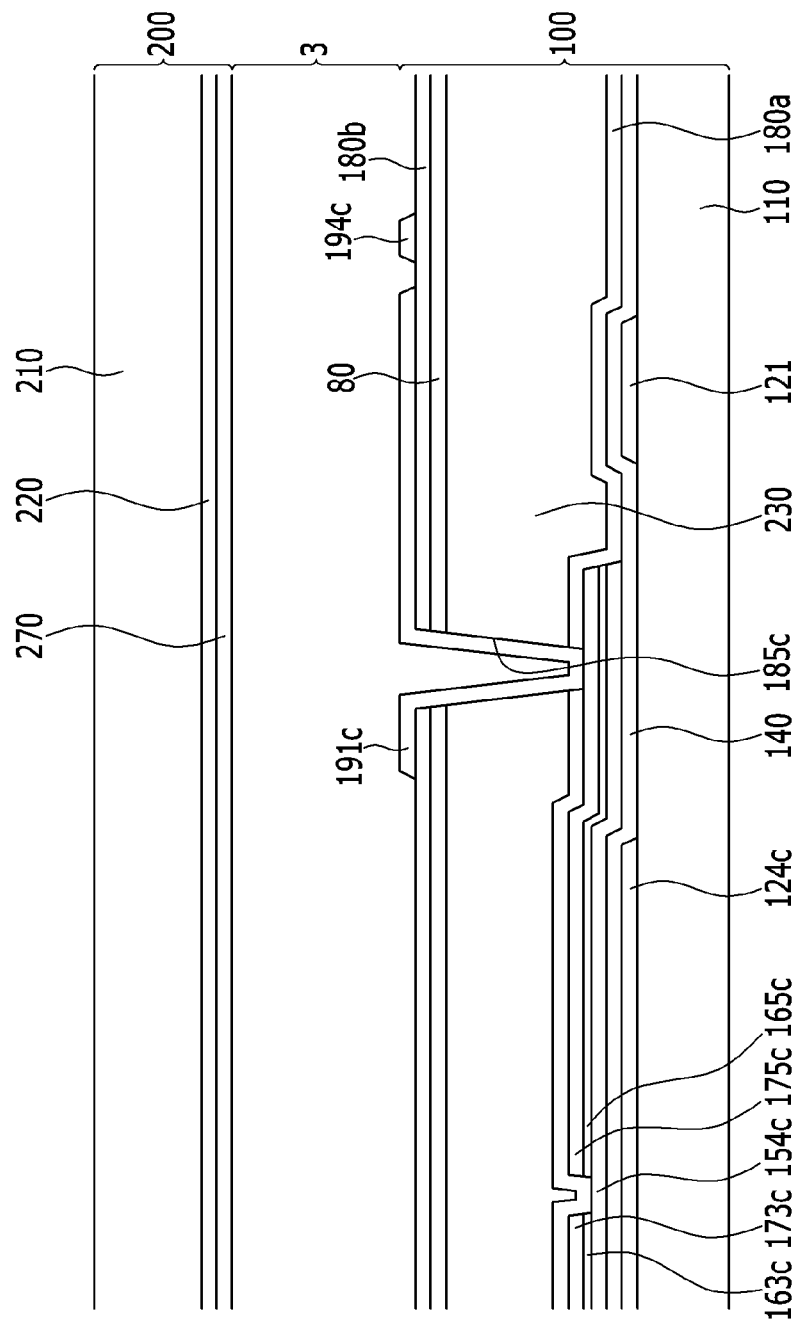
FIG. 3 is a cross-sectional view taken along the line III-III of FIG. 1.
Figure 4:
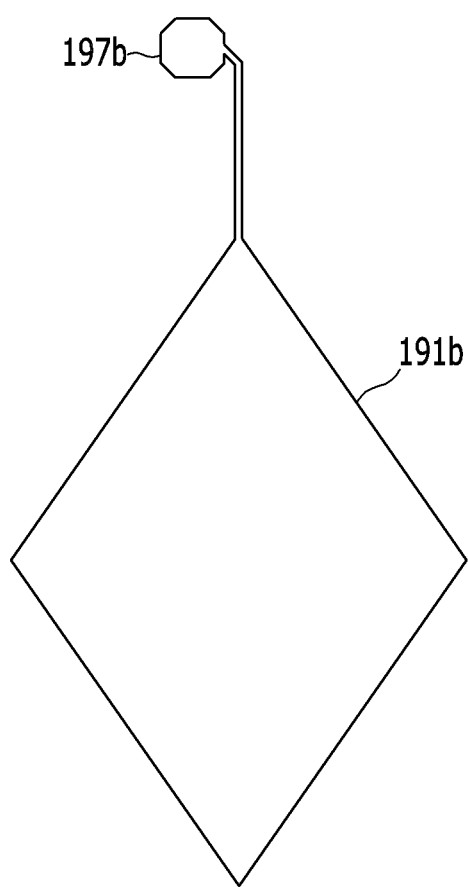
FIG. 4 is a layout view of a second subpixel electrode in a liquid crystal display according to an exemplary embodiment of the present invention.
Figure 5:
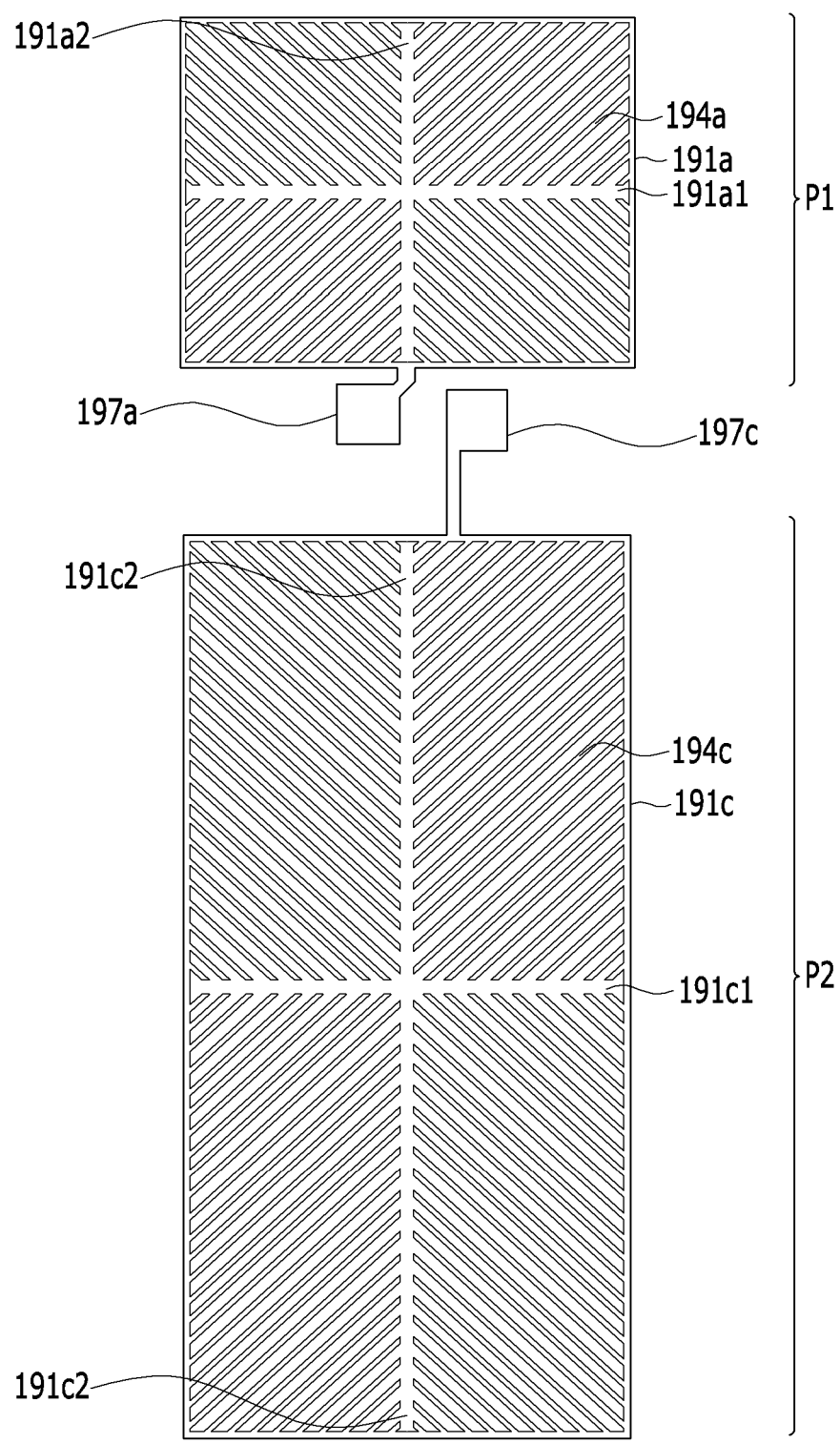
FIG. 5 is a layout view of a first subpixel electrode and a third subpixel electrode in a liquid crystal display according to an exemplary embodiment of the present invention.
Figure 6:
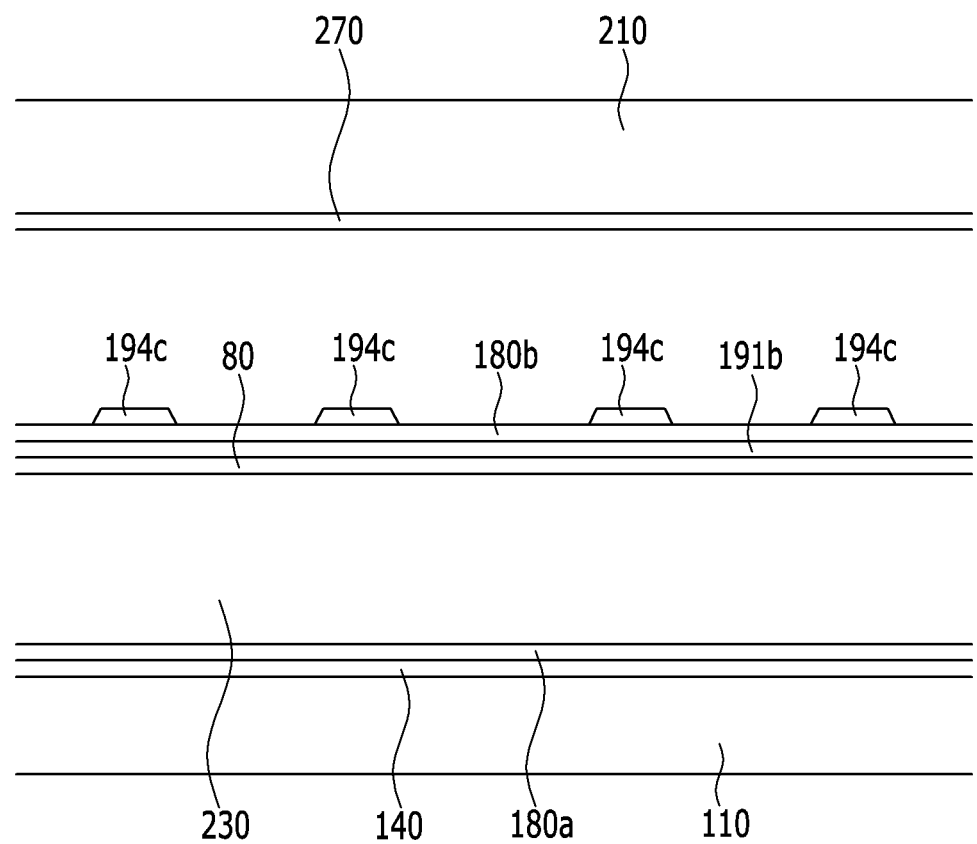
FIG. 6 is a cross-sectional view taken along the line VI-VI of FIG. 1.
Figure 7:
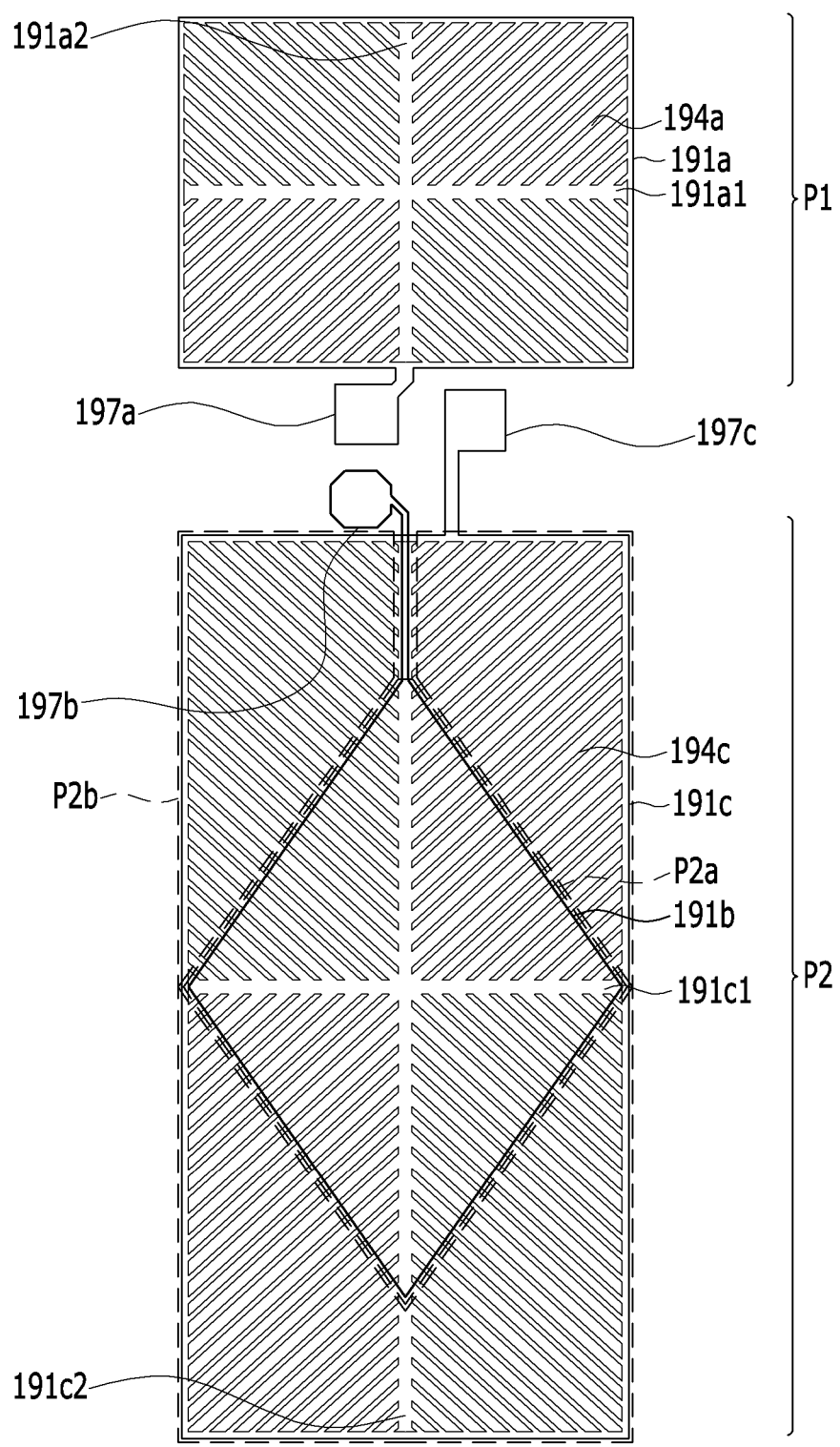
FIG. 7 is a layout view of a pixel area in a liquid crystal display according to an exemplary embodiment of the present invention.

FIG. 1 is a layout view of a liquid crystal display according to an exemplary embodiment of the present invention. FIG. 2 is a cross-sectional view taken along the line II-II of FIG. 1. FIG. 3 is a cross-sectional view taken along the line III-III of FIG. 1. FIG. 4 is a layout view of a second subpixel electrode in a liquid crystal display according to an exemplary embodiment of the present invention. FIG. 5 is a layout view of a first subpixel electrode and a third subpixel electrode in a liquid crystal display according to an exemplary embodiment of the present invention. FIG. 6 is a cross-sectional view taken along the line VI-VI of FIG. 1. FIG. 7 is a layout view of a pixel area in a liquid crystal display according to an exemplary embodiment of the present invention.

Referring to FIG. 1 to FIG. 3, the liquid crystal display according to the present exemplary embodiment includes a lower panel 100 and an upper panel 200 facing each other, with a liquid crystal layer 3 interposed between the two display panels 100 and 200.

First, the lower panel 100 will be described.

A gate line 121, a reference voltage line 131, and a storage electrode 135 are formed on an insulation substrate 110 made of transparent glass or plastic. The gate line 121 transfers a gate signal and mainly extends in a transverse direction.

The gate line 121 includes a first gate electrode 124a, a second gate electrode 124b, a third gate electrode 124c, and a fourth gate electrode 124d, and has a wide end (not shown) for connection with other layers or an external driving circuit.

The reference voltage line 131 may extend generally in parallel to the gate line 121 and has an expansion 136, and the expansion 136 may be connected to a third drain electrode 173d by a fourth contact hole 185d that will be described later.

The reference voltage line 131 includes the storage electrode 135 enclosing a pixel area.

A gate insulating layer 140 is formed on the gate line 121, the reference voltage line 131, and the storage electrode 135.

A first semiconductor 154a, a second semiconductor 154b, a third semiconductor 154c, and a fourth semiconductor 154d that may be made of amorphous silicon or crystalline silicon are disposed on the gate insulating layer 140.

A plurality of ohmic contacts 163a, 163b, 163c, 163d, 165a, 165b, 165c, and 165d are formed on the first semiconductor 154a, the second semiconductor 154b, the third semiconductor 154c, and the fourth semiconductor 154d. When the semiconductors 154a, 154b, 154c, and 154d are formed with an oxide semiconductor, the ohmic contacts may be omitted.

Data conductors 171, 173a, 173b, 173c, 173d, 175a, 175b, 175c, and 175d including a first data line 171, a first source electrode 173a, a second source electrode 173b, a third source electrode 173c connected to the first data line 171, a fourth source electrode 173d connected to the expansion 136 of the reference voltage line 131, and a first drain electrode 175a, a second drain electrode 175b, a third drain electrode 175c, and a fourth drain electrode 175d are formed on the ohmic contacts 163a, 163b, 163c, 163d, 165a, 165b, 165c, and 165d and the gate insulating layer 140.

The data conductors 171, 173a, 173b, 173c, 173d, 175a, 175b, 175c, and 175d and the underlying semiconductor layer and ohmic contact may be simultaneously formed by using one mask.

The data line 171 includes a wide end (not shown) for connection with other layers or an external driving circuit.

The second source electrode 173b is connected to the third source electrode 173c.

The first gate electrode 124a, the first source electrode 173a, and the first drain electrode 175a collectively form a first thin film transistor Qa along with the first semiconductor 154a, and a channel of the thin film transistor is formed in the semiconductor 154a between the first source electrode 173a and the first drain electrode 175a. Similarly, the second gate electrode 124b, the second source electrode 173b, and the second drain electrode 175b collectively form a second thin film transistor Qb along with the second semiconductor 154b, and a channel of the thin film transistor is formed in the semiconductor 154b between the second source electrode 173b and the second drain electrode 175b. Likewise, the third gate electrode 124c, the third source electrode 173c, and the third drain electrode 175c collectively form a third thin film transistor Qc along with the third semiconductor 154c, and a channel of the thin film transistor is formed in the semiconductor 154c between the third source electrode 173c and the third drain electrode 175c.

A first passivation layer 180a, that may be made of an inorganic insulator such as a silicon nitride or silicon oxide, is formed on the data conductors 171, 173a, 173b 173c, 173d, 175a, 175b, 175c, and 175d and the exposed portion of the semiconductor layers 154a, 154b, 154c, and 154d.

An organic layer 230 is disposed on the first passivation layer 180a. The organic layer 230 may act to flatten and may be a color filter. The organic layer 230 used as a color filter may be elongated in a vertical direction along columns of the pixel electrodes 191. Each color filter 230 may display one of three primary colors such as red, green, and blue. However, it is not limited to three primary colors such as red, green, and blue, and may display one of cyan, magenta, yellow, and white-based colors, or any other suitable color.

An overcoat 80 is disposed on the organic layer 230. The overcoat 80 prevents peeling of the organic layer 230, and also suppresses contamination of a liquid crystal layer 3 by an organic material of the solvent that inflows from the color filter 230, so that it prevents defects such as afterimages that may occur when an image is driven.

A second subpixel electrode 191b is disposed over the overcoat 80. With respect to the gate line 121 shown in FIG. 1, when a pixel portion above the gate line 121 is referred to as a first region P1 and a pixel portion below the gate line 121 is referred to as a second region P2, the second subpixel electrode 191b is disposed in the second region P2. The second subpixel electrode 191b will be further described with reference to FIG. 4.

Referring to FIG. 1 and FIG. 4, the second subpixel electrode 191b includes a portion formed having a planar, rhomboid shape positioned at a center portion of the second region P2, and an upper protrusion 197b overlapping the wide end of the second drain electrode 175b. The second subpixel electrode 191b may be formed of a transparent conductive material such as ITO or IZO. The planar shape is a single unitary and continuous shape without any slits.

A first passivation layer 180a and the organic layer 230 have a second contact hole 185b exposing a portion of the second drain electrode 175b. The second subpixel electrode 191b is electrically connected to the second drain electrode 175b through the second contact hole 185b such that the data signal applied through the data line 171 may be charged to the second subpixel electrode 191b through the second drain electrode 175b.

A second passivation layer 180b is disposed on the overcoat 80 and the second subpixel electrode 191b.

A first subpixel electrode 191a and a third subpixel electrode 191c are disposed on the second passivation layer 180b. Referring to FIG. 5, the first subpixel electrode 191a and the third subpixel electrode 191c will be described.

Referring to FIG. 1 and FIG. 5, the first subpixel electrode 191a is disposed at the first region P1, and the third subpixel electrode 191c is disposed at the second region P2. The first subpixel electrode 191a and the third subpixel electrode 191c may be formed of a transparent conductive material such as ITO or IZO.

The first subpixel electrode 191a and the third subpixel electrode 191c are disposed to cover most of the unit pixel area, and to each have a slit structure. The overall shape of each of the first subpixel electrode 191a and the third subpixel electrode 191c is a quadrangle.

The first subpixel electrode 191a includes a cross-shaped portion made of a transverse portion 191a1 and a longitudinal portion 191a2 crossing the transverse portion 191a1. Also, four subregions are formed by the transverse portion 191a1 and the longitudinal portion 191a2, and each subregion includes a plurality of branch electrodes 194a. The subregions of the first subpixel electrode 191a are symmetric with respect to the cross-shaped portion. A portion where an electrode does not exist between adjacent branch electrodes 194a corresponds to a slit.

Like the first subpixel electrode 191a, the third subpixel electrode 191c includes a cross-shaped portion made of a transverse portion 191c1 and a longitudinal portion 191c2 crossing the transverse portion 191c1. Also, four subregions are formed by the transverse portion 191c1 and the longitudinal portion 191c2, and each subregion includes a plurality of branch electrodes 194c. The subregions of the third subpixel electrode 191c are symmetric with respect to their cross-shaped portion. A portion where an electrode does not exist between the adjacent branch electrodes 194c corresponds to a slit.

In the present exemplary embodiment, the cross-shaped portions including the transverse portions 191a1 and 191c1 and the longitudinal portions 191a2 and 191c2 correspond to an opening portion where the electrode does not exist, and a plurality of branch electrodes 194a and 194c are connected to each other at an edge of the first subpixel electrode 191a and the third subpixel electrode 191c. However, the prevent invention is not limited thereto, and the opening portion and the electrode portion may be exchanged such that the electrodes may be formed at the transverse portions 191a and 191c1 and the longitudinal portions 191a2 and 191c2.

Referring to FIG. 1 and FIG. 6, the third subpixel electrode 191c overlaps the second subpixel electrode 191b disposed at the second region P2. The second subpixel electrode 191b is relatively small compared to the third subpixel electrode 191c, such that the second region P2 may be divided into a portion where the second subpixel electrode 191b and the third subpixel electrode 191c overlap each other and a portion where only the third subpixel electrode 191c is formed.

Again referring to FIG. 1 and FIG. 3, the first passivation layer 180a, the organic layer 230, and the overcoat 80 have a first contact hole 185a and a third contact hole 185c formed therethrough and respectively exposing portions of the first drain electrode 175a and the third drain electrode 175c.

A protrusion 197a of the first subpixel electrode 191a is electrically connected to the first drain electrode 175a through the first contact hole 185a, such that the data signal applied through the data line 171 may be charged to the first subpixel electrode 191a through the first drain electrode 175a.

A protrusion 197c of the third subpixel electrode 191c is electrically connected to the third drain electrode 175c and the fourth drain electrode 175d through the third contact hole 185c such that the data signal applied through the data line 171 may be charged to the third subpixel electrode 191c through the third drain electrode 175c. At this time, the third subpixel electrode 191c is connected to the fourth drain electrode 175d as well as the third drain electrode 175c by the signal applied through the reference voltage line 131, such that the voltage applied to the third subpixel electrode 191c is actually divided through the fourth thin film transistor connected to the reference voltage line 131. Accordingly, the voltage applied to the third subpixel electrode 191c is smaller than the voltage applied to the first subpixel electrode 191a.

Next, the upper panel 200 will be described.

A light blocking member 220 and a common electrode 270 are formed on an insulation substrate 210 made of transparent glass or plastic. The light blocking member 220 is referred to as a black matrix and prevents light leakage.

However, in the case of the liquid crystal display according to another exemplary embodiment of the present invention, the light blocking member 220 may instead be disposed in the lower panel 100, while in a case of a liquid crystal display according to another exemplary embodiment, the color filter may be disposed in the upper panel 200.

Alignment layers (not shown) may be formed on inner surfaces of the display panels 100 and 200, and they may be vertical alignment layers.

Polarizers (not shown) are provided on the outer surfaces of the two display panels 100 and 200, the transmissive axes of two polarizers are crossed, and it is preferable that one transmissive axis is parallel to the gate line 121. However, a polarizer may only be disposed at one outer surface of the two display panels 100 and 200.

The liquid crystal layer 3 has negative dielectric anisotropy, and liquid crystal molecules of the liquid crystal layer 3 may be aligned so that long axes thereof are perpendicular to the inner surfaces of the two display panels 100 and 200 when no electric field is present. Therefore, incident light does not pass through the crossed polarizers but is blocked in a state when no electric field is applied.

At least one of the liquid crystal layer 3 and the alignment layer may include a photoreactive material, in detail, a reactive mesogen.

Next, a driving method of a liquid crystal display according to the present exemplary embodiment will be described.

If a gate-on signal is applied to the gate line 121, the gate-on signal is applied to the first gate electrode 124a, the second gate electrode 124b, the third gate electrode 124c, and the fourth gate electrode 124d such that the first through third thin film transistors are turned on. Accordingly, the data voltage applied to the data line 171 is applied to the first subpixel electrode 191a, the second subpixel electrode 191b, and the third subpixel electrode 191c through the turned-on first thin film transistor, second thin film transistor, and third thin film transistor. At this time, the first subpixel electrode 191a and the second subpixel electrode 191b each receive a voltage of the same magnitude. Also, the first subpixel electrode 191a and the third subpixel electrode 191c each receive a voltage of the same magnitude. However, the voltage applied to the third subpixel electrode 191c is divided through the fourth thin film transistor connected to the third thin film transistor in series. Accordingly, the voltage applied to the third subpixel electrode 191c is smaller than the voltage applied to the first subpixel electrode 191a.

Next, the first region P1 and the second region P2 included in one pixel area of the liquid crystal display according to the present exemplary embodiment will be described with reference to FIG. 1 and FIG. 7.

Referring to FIG. 1 and FIG. 7, one pixel area of the liquid crystal display according to the present exemplary embodiment includes the first region P1 where the first subpixel electrode 191a is disposed, as well as a second region P2 which has a 2a region P2a where the second subpixel electrode 191b and the third subpixel electrode 191c overlap, and a 2b region P2b where only the third subpixel electrode 191c is formed.

In the first region P1 of one pixel area of the liquid crystal display according to the present exemplary embodiment, the first subpixel electrode 191a disposed at the lower panel 100 and the common electrode 270 disposed at the upper panel 200 generate an electric field. At this time, the first subpixel electrode 191a includes a cross-shaped portion and a plurality of branch electrodes 194a extending in four different directions. The plurality of branch electrodes 194a may form an angle of about 40 degrees to about 45 degrees with respect to the gate line 121. Due to the fringe field generated by the edges of the plurality of branch electrodes 194a, the liquid crystal molecules of the liquid crystal layer 3 disposed at the first region P1 are slanted in four different directions. In detail, a horizontal component of the fringe field generated by a plurality of branch electrodes 194a is almost parallel to the sides of the plurality of branch electrodes 194a, such that the liquid crystal molecules are inclined in directions parallel to the length directions of the plurality of branch electrodes 194a.

In the 2a region P2a of the center of the second region P2 of one pixel area of the liquid crystal display according to the present exemplary embodiment, the liquid crystal molecules of the liquid crystal layer 3 are arranged by the electric field formed between the third subpixel electrode 191c and the common electrode 270, along with the electric field formed between the second subpixel electrode 191b of the lower panel 100 and the common electrode 270 of the upper panel 200.

Next, in the 2a region P2a of the center of the second region P2 of one pixel area of the liquid crystal display according to the present exemplary embodiment, the third subpixel electrode 191c disposed at the lower panel 100 and the common electrode 270 disposed at the upper panel 200 generate the electric field in the liquid crystal layer 3.

As described above, the magnitude of the third voltage applied to the third subpixel electrode 191c is smaller than the magnitude of the first voltage applied to the first subpixel electrode 191a.

Accordingly, the intensity of the electric field applied to the liquid crystal layer disposed at the first region P1 is strongest, and the intensity of the electric field applied to the liquid crystal layer disposed at the 2b region P2b is smallest. In the 2a region R2a, since an influence of the electric field of the second subpixel electrode 191b disposed under the third subpixel electrode 191c exists, the intensity of the electric field applied to the liquid crystal layer 3 disposed at the 2a region P2a is smaller than the intensity of the electric field applied to the liquid crystal layer 3 disposed at the first region P1 and is larger than the intensity of the electric field applied to the liquid crystal layer disposed at the 2b region P2b.

Accordingly, in the liquid crystal display according to an exemplary embodiment of the present invention, one pixel area is divided into a first region where the first subpixel electrode receives a relatively high first voltage; a 2a region where the second subpixel electrode receives a second voltage that is the same as the first voltage, a portion of the third subpixel electrode receives a relatively low third voltage, and the second and third subpixel electrodes overlap each other via the insulating layer; and a 2b region where the third subpixel electrode receives the relatively low third voltage. Accordingly, the intensities of the electric field applied to the liquid crystal molecules corresponding to the first region, the 2a region, and the 2b region are different such that the inclination angles of the liquid crystal molecules are different, thereby realizing different luminance for each region. Thus, by dividing one pixel area into three regions having different luminances, the change of the transmittance according to a gray may be smoother, thereby preventing a sharp change of transmittance according to a gray change in a low gray and a high gray at the side, while approximating the lateral visibility to the front visibility. Thus, gray expression in the low gray and the high gray is improved.

Figure 8:
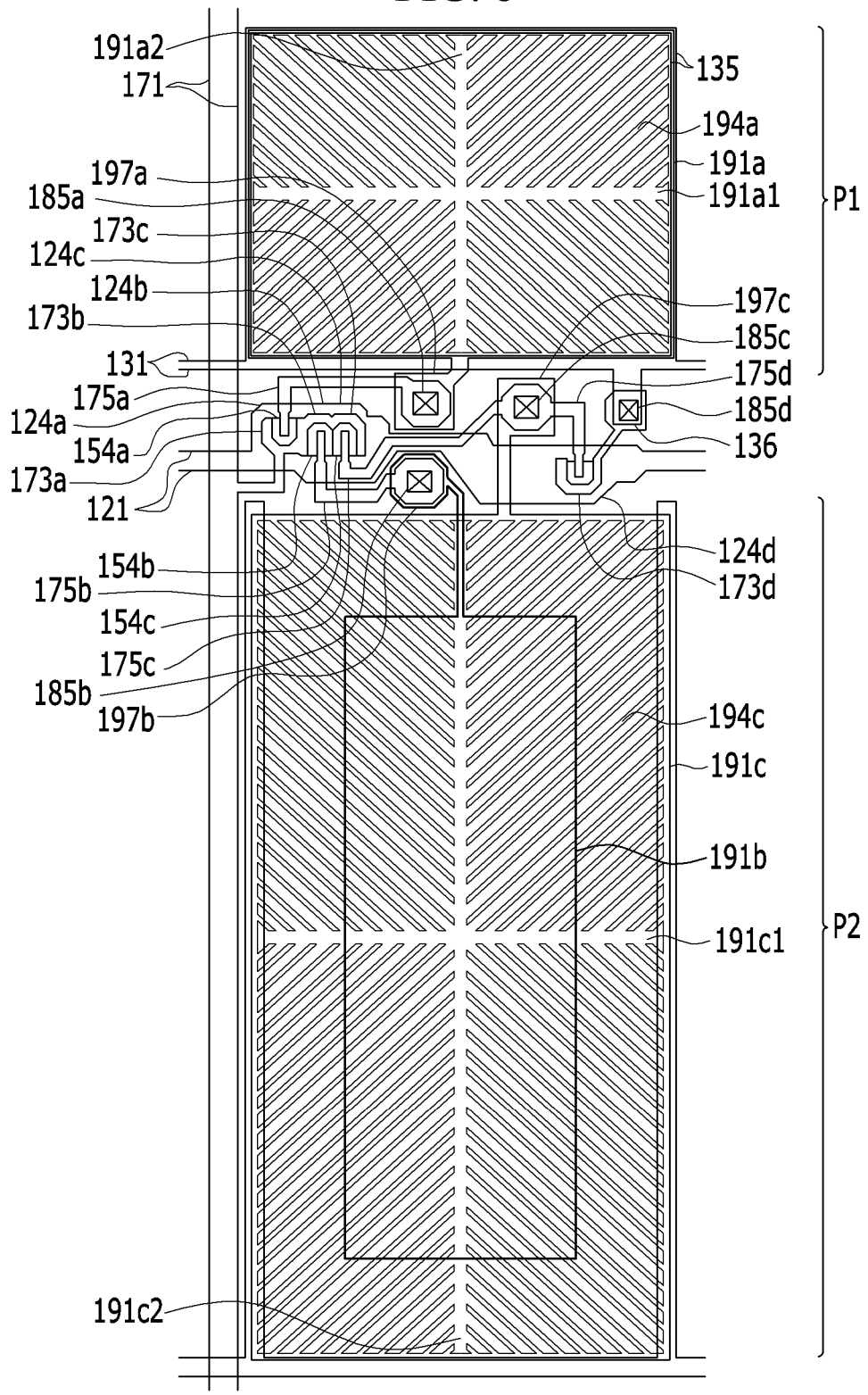
FIG. 8 is a layout view of a liquid crystal display according to an exemplary embodiment of the present invention.

FIG. 8 is a layout view of a liquid crystal display according to another exemplary embodiment of the present invention.

The exemplary embodiment described in FIG. 8 is almost the same as the exemplary embodiment described in FIG. 1 to FIG. 7. However, differently from the previous exemplary embodiment, the second subpixel electrode 191b has a shape extending generally along the longitudinal portion 191c2 of the third subpixel electrode 191c. More specifically, the second subpixel electrode 191b has an elongated rectangular shape similar to that of the third subpixel electrode 191c.

Figure 9:
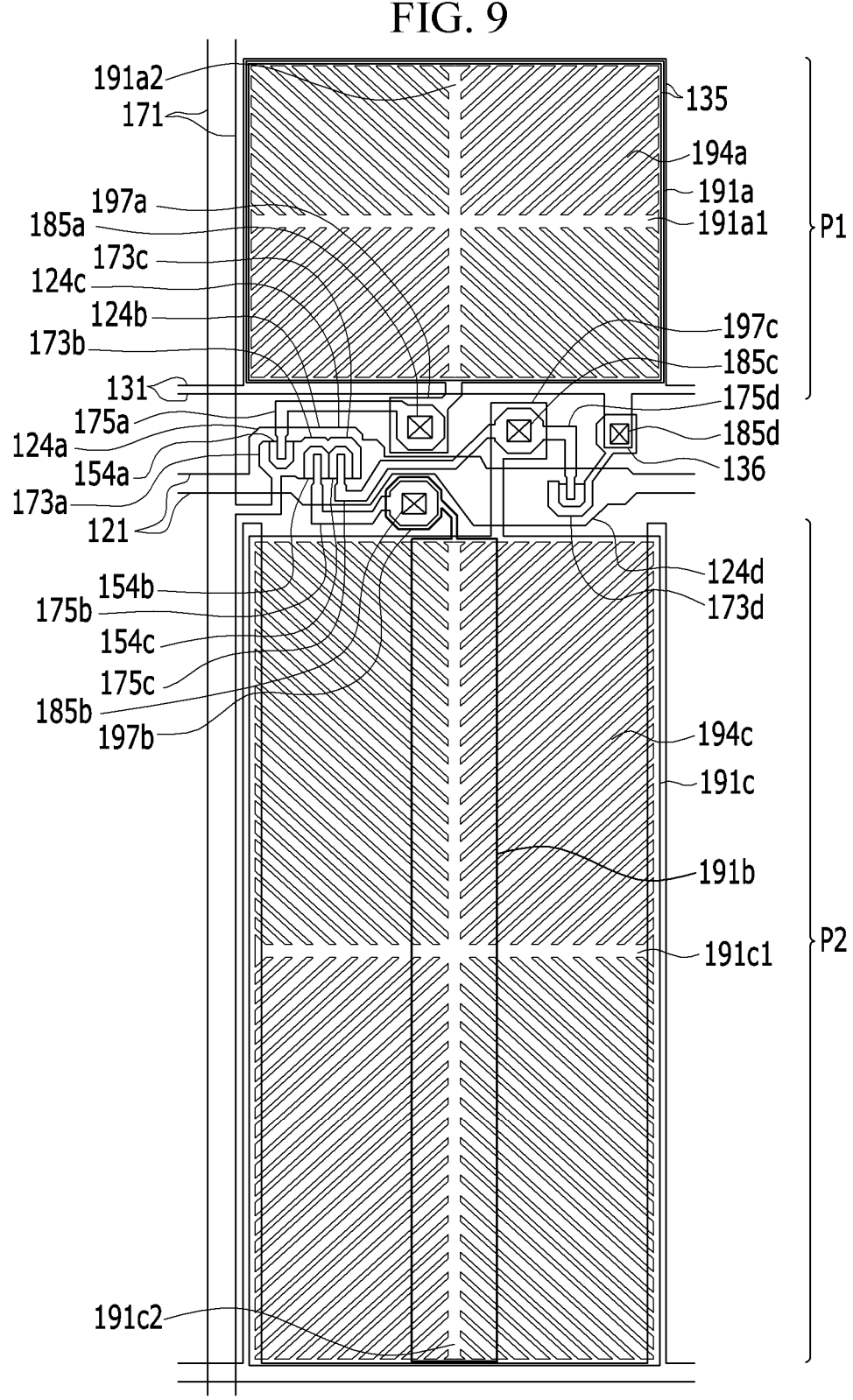
FIG. 9 is a layout view of a liquid crystal display according to an exemplary embodiment of the present invention.

FIG. 9 is a layout view of a liquid crystal display according to a further exemplary embodiment of the present invention.

The exemplary embodiment described in FIG. 9 is almost the same as the exemplary embodiment described in FIG. 8. In particular, the second subpixel electrode 191b has an elongated rectangular shape. However, the second subpixel electrode 191b has a thinner width than the second subpixel electrode 191b described in FIG. 8, and a longer shape in the vertical direction.

Figure 10:
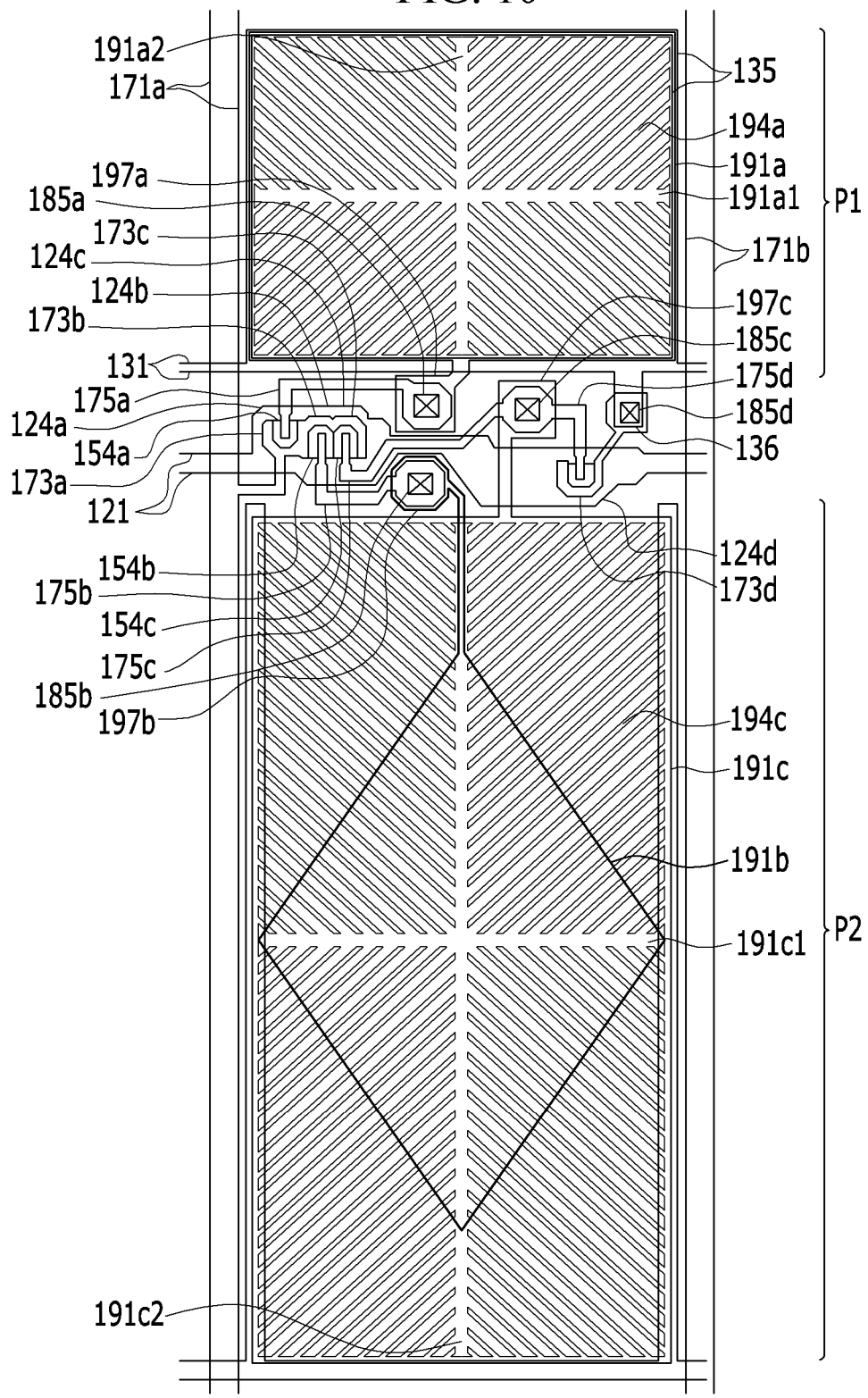
FIG. 10 is a layout view of a liquid crystal display according to an exemplary embodiment of the present invention.

FIG. 10 is a layout view of a liquid crystal display according to yet another exemplary embodiment of the present invention.

The exemplary embodiment described in FIG. 10 is almost the same as the exemplary embodiment described in FIG. 1. However, as a difference, a first data line 171a and a second data line 171b are disposed at right and left sides with respect to one pixel area. The description of FIG. 1 may be applied to the exemplary embodiment of FIG. 10. Hereinafter, in the liquid crystal display according to this further exemplary embodiment of the present invention, by forming two data lines 171a and 171b corresponding to one pixel area, a luminance non-uniformity may be prevented while realizing high speed driving. This will be further described below.

FIG. 11 to FIG. 14 are schematic diagrams of a driving method of a liquid crystal display according to an exemplary embodiment of the present invention. FIG. 11 to FIG. 14 are the views in which unit pixel areas of FIG. 10 are arranged in a matrix shape.

Referring to FIG. 10 to FIG. 14, unit pixel areas PX(N) (N is a natural number) according to the present exemplary embodiment are divided based on the gate lines 121. As described above, again referring to FIG. 10, the unit pixel areas PX(N) may include a first region P1 disposed above the gate line 121 and a second region P2 disposed below the gate line 121. In the present exemplary embodiment, two data lines 171a and 171b corresponding to one unit pixel area PX(N) may be driven with column inversion.

Figure 11:
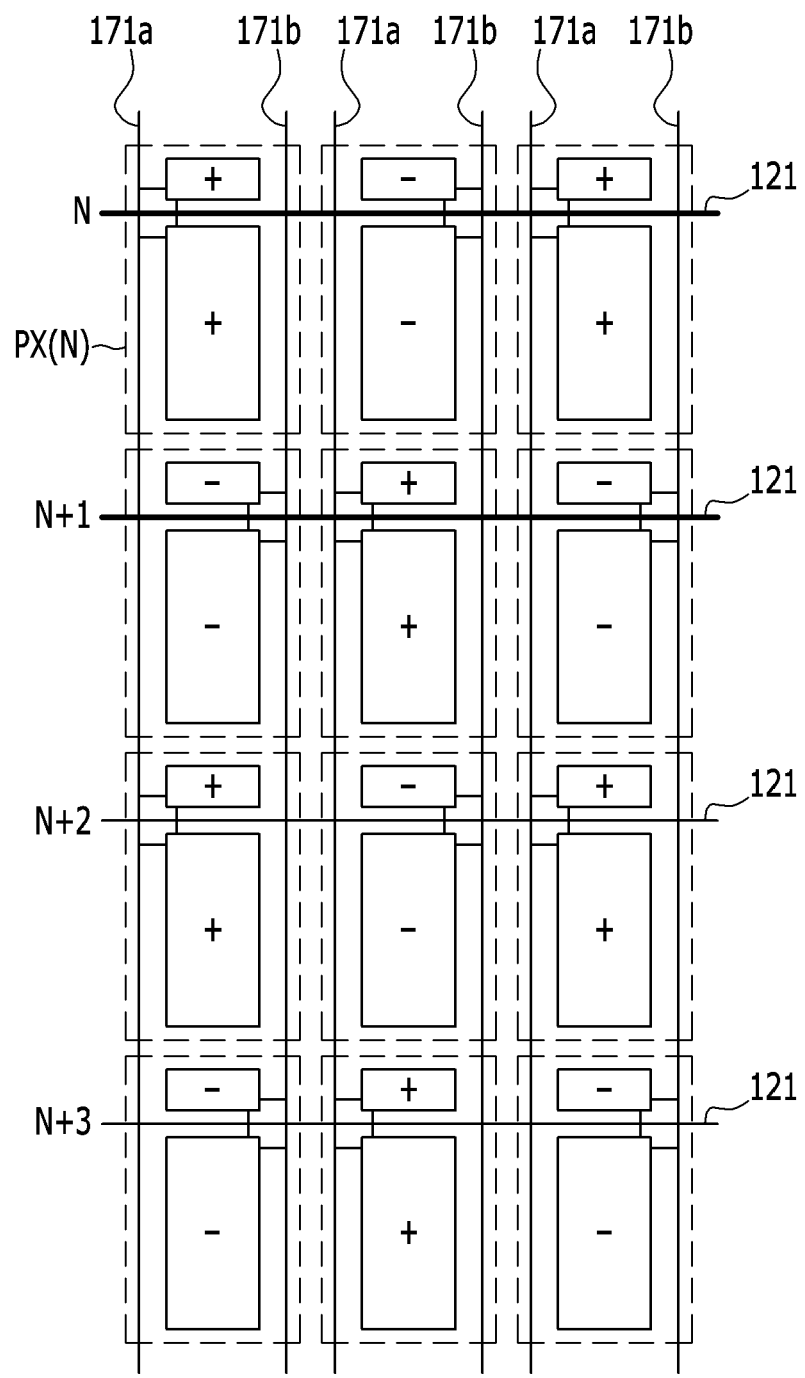
FIG. 11 to FIG. 14 are schematic diagrams representing a driving method of a liquid crystal display according to an exemplary embodiment of the present invention.

Referring to FIG. 10 and FIG. 11, the liquid crystal display according to an exemplary embodiment of the present invention simultaneously turns on the N-th gate line and the (N+1)-th gate line, and charges the pixel electrodes 191a, 191b, and 191c through the data lines 171a and 171b. Two gate lines are simultaneously turned on for the charging such that the charging time may be decreased.

Figure 12:
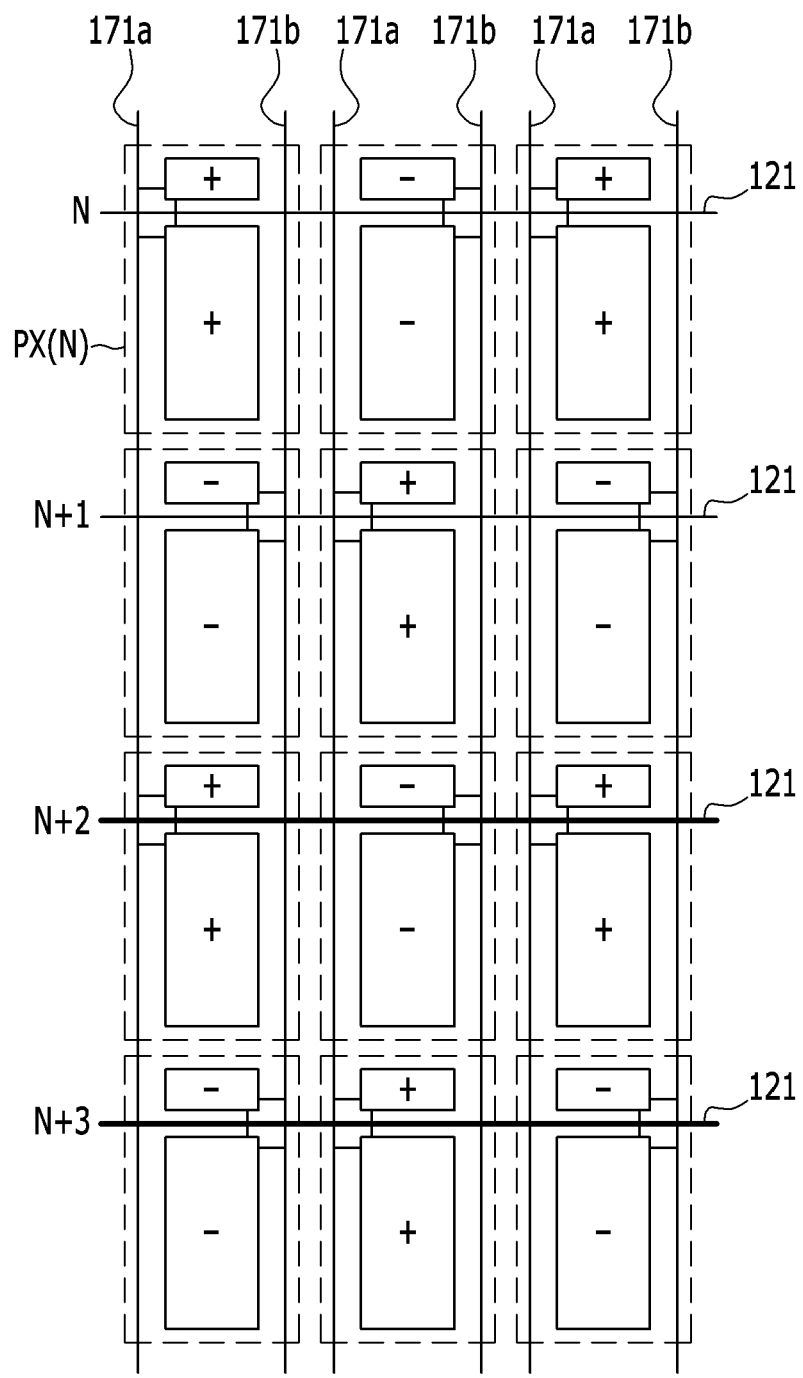

Referring to FIG. 10 and FIG. 12, while the N-th gate line and the (N+1)-th gate line of the turned on state are turned off, the (N+2)-th gate line and the (N+3)-th gate line are simultaneously turned on such that the corresponding pixel electrodes 191a, 191b, 191c may be charged.

Figure 13:
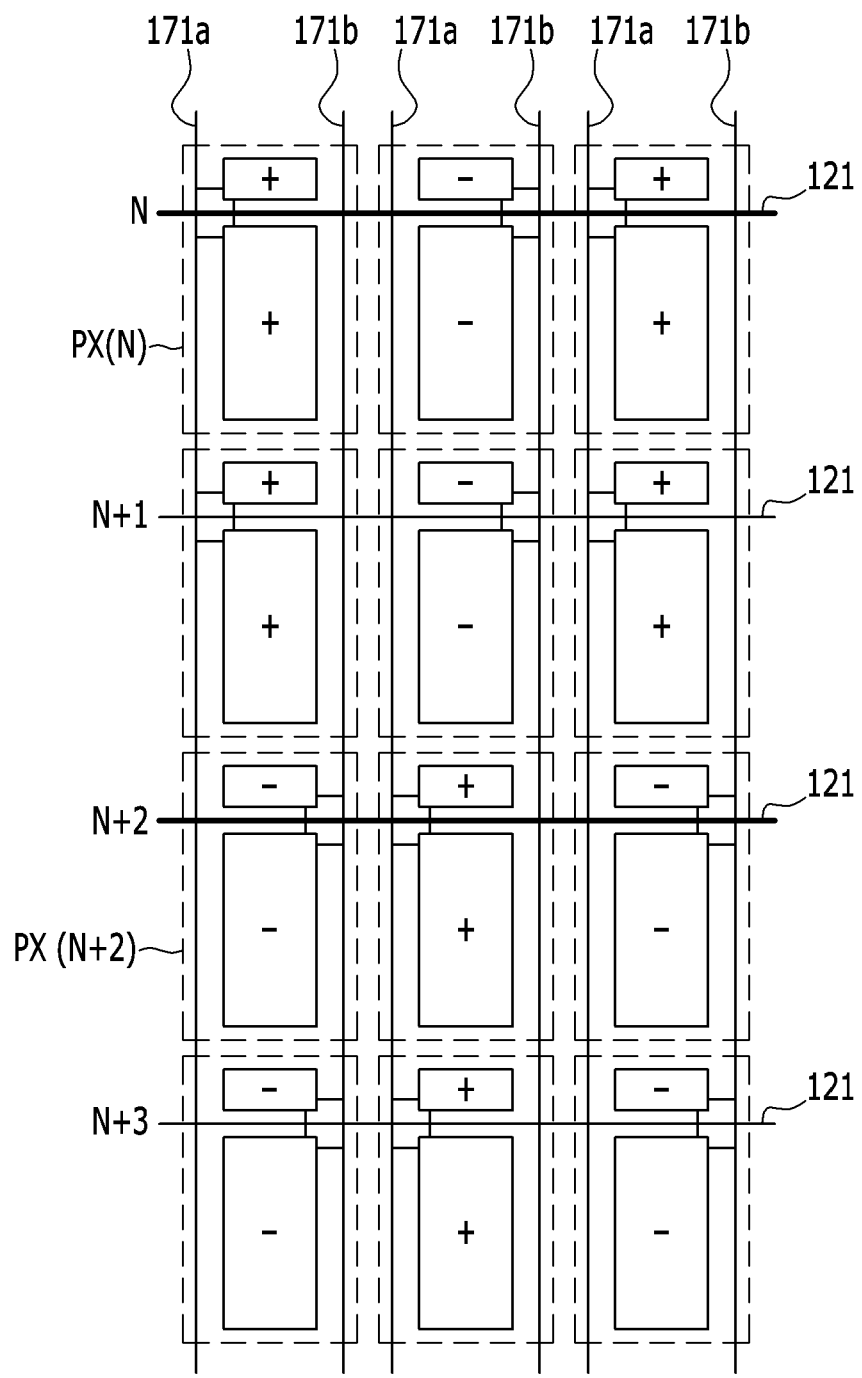

Referring to FIG. 10 and FIG. 13, the liquid crystal display according to an exemplary embodiment of the present invention firstly simultaneously turns on the N-th gate line and the (N+2)-th gate line and charges the pixel electrodes of the N-th pixel area PX(N) and the pixel electrodes of the (N+2)-th pixel area PX(N+2). Two gate lines are simultaneously turned on for the charge such that the charging time may be decreased.

Figure 14:
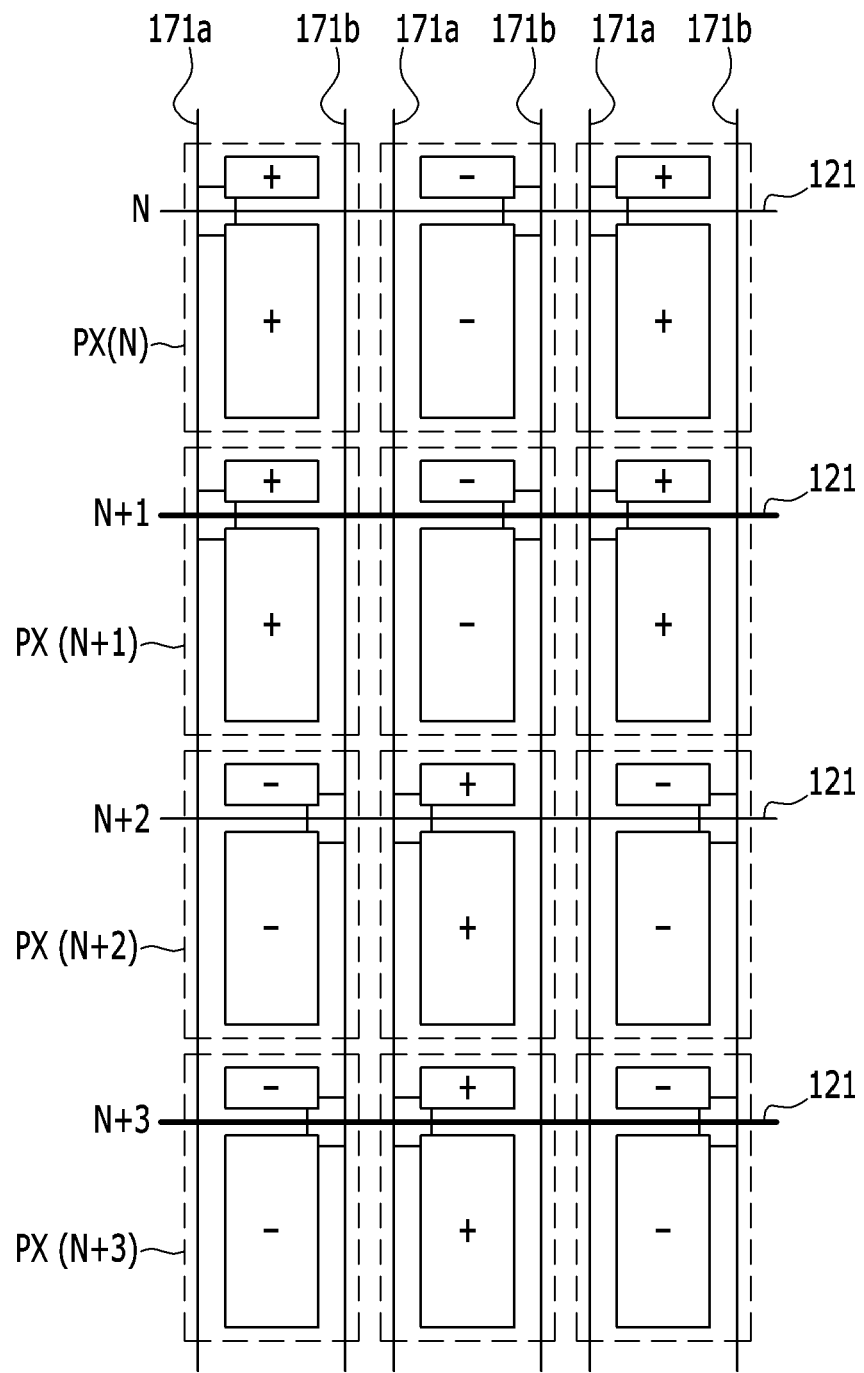

Referring to FIG. 10 and FIG. 14, while the turned on N-th gate line and the (N+2)-th gate line are turned off, the (N+1)-th gate line and the (N+3)-th gate line are simultaneously turned on such that the pixel electrodes of the (N+1)-th pixel area PX(N+1) and the pixel electrodes of the (N+3)-th pixel area PX(N+3) may be charged. Next, if the (N+1)-th gate line is turned off, the voltage of the charged (N+2)-th pixel area PX(N+2) may be dropped. Accordingly, a conventional (N+2)-th pixel area PX(N+2) may appear excessively bright or excessively dark. However, in the liquid crystal display according to the present exemplary embodiment, since the second region P2 of the (N+1)-th pixel area PX(N+1) is disposed between the (N+1)-th gate line and the (N+2)-th pixel area PX(N+2), the luminance non-uniformity caused by the parasitic capacitance between the (N+1)-th gate line and the pixel electrode of the (N+2)-th pixel area PX(N+2) may be prevented or reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For example, the various features of any embodiments may be mixed and matched in any manner, to form further embodiments contemplated by the invention.

| <Description of Symbols> | | | |
|---|---|---|---|
| 110, 210 | substrate | | |
| 121 | gate line | 131 | reference electrode line |
| 140 | gate insulating layer | 171 | data line |
| 180a, 180b | passivation layer | 191a, 191b, 191c | pixel electrode |
| 220 | light blocking member | 230 | organic layer |
| 270 | common electrode | | |

What is claimed is:

1. A liquid crystal display comprising:
   a first substrate;
   a first subpixel electrode disposed on the first substrate and configured to have a first voltage applied thereto;
   a second subpixel electrode disposed on the first substrate and configured to have a second voltage applied thereto;
   a third subpixel electrode disposed on the first substrate and configured to have a third voltage applied thereto;

an insulating layer between the first subpixel electrode and the second subpixel electrode or between the second subpixel electrode and the third subpixel electrode; and a common electrode disposed on a second substrate and configured to have a common voltage applied thereto, wherein the second subpixel electrode and the third subpixel electrode overlap each other with the insulating layer positioned therebetween, wherein the first subpixel electrode and the third subpixel electrode are disposed on opposing sides of the gate line, and wherein the first voltage and the third voltage are different.

2. The liquid crystal display of claim 1, wherein the first voltage and the second voltage are the same.

3. The liquid crystal display of claim 2, wherein a difference between the first voltage and the common voltage is larger than a difference between the third voltage and the common voltage.

4. The liquid crystal display of claim 3, wherein the second subpixel electrode is disposed under the insulating layer, and the first subpixel electrode and the third subpixel electrode are disposed on the insulating layer.

5. The liquid crystal display of claim 4, wherein:
when the first voltage is applied to the first subpixel electrode, a first electric field is formed in a first region in which the first subpixel electrode is disposed;
when the second and third voltages are respectively applied to the second and third subpixel electrodes, a second electric field is formed in a second region in which the second and third subpixel electrodes overlap each other;
when the third voltage is applied to the third subpixel electrode, a third electric field is formed in a third region in which the third subpixel electrode is disposed but not the second subpixel; and
the first, second, and third electric fields respectively have different magnitudes from one another.

6. The liquid crystal display of claim 2, wherein the first subpixel electrode and the second subpixel electrode are connected to a same input electrode through a first contact hole and a second contact hole.

7. The liquid crystal display of claim 6, wherein when applied, the first voltage is applied to the first subpixel electrode by the input electrode, and the second voltage is applied to the second subpixel electrode.

8. The liquid crystal display of claim 7, wherein the second subpixel electrode is disposed under the insulating layer, and the first subpixel electrode and the third subpixel electrode are disposed on the insulating layer.

9. The liquid crystal display of claim 8, further comprising a passivation layer disposed between the first substrate and the second subpixel electrode, wherein the first contact hole is formed through the passivation layer and the insulating layer, and the second contact hole is formed through the passivation layer.

10. The liquid crystal display of claim 8, wherein the third subpixel electrode is connected to an output electrode through a third contact hole.

11. The liquid crystal display of claim 10, wherein when applied, the third voltage is applied by the output electrode.

12. The liquid crystal display of claim 11, wherein a difference between the first voltage and the common voltage is smaller than a difference between the third voltage and the common voltage.

13. The liquid crystal display of claim 12, wherein:
when the first voltage is applied to the first subpixel electrode, a first electric field is formed in a first region in which the first subpixel electrode is disposed;
when the second and third voltages are respectively applied to the second and third subpixel electrodes, a second electric field is formed in a second region in which the second and third subpixel electrodes overlap each other;
when the third voltage is applied to the third subpixel electrode, a third electric field is formed in a third region in which the third subpixel electrode is disposed but not the second subpixel; and
the first, second, and third electric fields respectively have different magnitudes from one another.

14. The liquid crystal display of claim 1, wherein the first subpixel electrode and the third subpixel electrode each include a plurality of branch electrodes extending in different directions.

15. The liquid crystal display of claim 14, wherein the second subpixel electrode is at least approximately planar.

16. The liquid crystal display of claim 15, wherein the first subpixel electrode and the third subpixel electrode each outline a cross-shaped portion including a transverse portion and a longitudinal portion crossing the transverse portion, and a plurality of branch electrodes are at least approximately symmetric with respect to the cross-shaped portion.

17. The liquid crystal display of claim 16, wherein the second subpixel electrode has a shape that is at least approximately symmetric with respect to the cross-shaped portion.

18. The liquid crystal display of claim 1, further comprising:
a plurality of gate lines disposed on the first substrate and configured to have a gate signal applied thereto; and
a plurality of data lines crossing the plurality of gate lines and configured to have a data signal applied thereto,
wherein the plurality of data lines are configured to be driven by column inversion, and two gate lines among the plurality of gate lines are configured to be simultaneously turned on.

19. The liquid crystal display of claim 18, wherein:
the plurality of gate lines include an N-th gate line, an (N+1)-th gate line, an (N+2)-th gate line, and an (N+3)-th gate line; and
the N-th gate line and the (N+1)-th gate line are configured to be simultaneously turned on, and the (N+2)-th gate line and the (N+3)-th gate line are configured to be simultaneously turned on.

20. The liquid crystal display of claim 18, wherein the plurality of gate lines includes an N-th gate line, an (N+1)-th gate line, an (N+2)-th gate line, and an (N+3)-th gate line, and
the N-th gate line and the (N+2)-th gate line are configured to be simultaneously turned on, and the (N+1)-th gate line and the (N+3)-th gate line are configured to be simultaneously turned on.

* * * * *